Patented Dec. 8, 1925.

1,564,599

UNITED STATES PATENT OFFICE.

JOHN G. MAGAW AND ADDISON SHERMAN MAGAW, OF LAKEWOOD, OHIO.

PROCESS FOR PRESERVING FRUITS.

No Drawing.   Application filed July 8, 1925.   Serial No. 42,308.

*To all whom it may concern:*

Be it known that we, JOHN G. MAGAW and ADDISON SHERMAN MAGAW, citizens of the United States, residing at Lakewood, in the county of Cuyahoga and State of Ohio, have invented certain new and useful Improvements in Processes for Preserving Fruits, of which the following is a specification.

Our invention relates to the preservation of fruits, and more particularly to the preservation of such perishable fruits as strawberries, cherries, blackberries and kindred fruits.

This application is a continuation in part of our copending application, Serial No. 4,253, filed January 23, 1925.

The primary object of our invention is to provide a process for preserving perishable fruits and the like without the employment of heat and to so preserve such fruits that they will retain their original color and other physical characteristics. It is a known fact that fruits of a perishable character of the kind defined are extremely difficult and expensive to preserve, as it is usually the practice to cook such fruits and thereafter can them in air tight containers. It is, of course, most desirable that the preserved fruits shall be, when ready for use, as nearly in their original condition as possible. The usual practice of cooking and preserving fruits invariably destroys the original color, flavor and other physical characteristics present in fresh fruits.

It is a particular object of this invention to so preserve the fruits that they will retain for long periods, their original color and other physical characteristics and to this end the present invention comprehends the addition to the fruits of a substance composed largely of dextrose. The dextrose may be added to the fruits in the proportion of one part of dextrose to two parts of fruit. However, a much smaller proportion of dextrose may be employed. Satisfactory results can be obtained by adding to the fruits one part of dextrose to from four to five parts of fruit. The above proportions are merely illustrative, it being understood that our invention contemplates the addition of a substantial quantity of dextrose to the fruits. After the addition of the dextrose to the fruits, the mixture is subjected to a sharp freeze at a substantially zero temperature and is thereafter maintained substantially at this temperature until ready for use. The fruits are according to this process, preserved in their fresh condition and accordingly the customary cooking of the fruits is obviated. By our process the fruits can be effectively preserved and at the same time retain their original color, taste and freshness.

Dextrose has been found to possess special quality as a preserving agent for fruits and berries when cold packed, and to be superior to any other preserving agents heretofore employed and has been found to be one of the most quickly assimilated when taken into the body, as it is practically predigested and passes through the stomach without taxing the digestive organs and is quickly taken up by the blood. The dextrose furthermore does not remove the original acids from the fruit, but on the other hand acidulates and leaves the acid in the fruit. It has also been discovered that dextrose does not impart to the fruit an undesirable sweetening effect which so frequently destroys the natural flavor caused by the preserving of fruits with sugars and the like. By using dextrose and treating the fruits in accordance wth our invention, the preserved fruit can be kept for a considerable time after it has been thawed out without fermenting or molding.

It will therefore be seen that we have discovered a process for preserving fruits by which the fruits can be effectively preserved for long periods of time and retain their original color, flavor and other physical characteristics.

What we claim as our invention is:

A process of preserving perishable fruits and berries without the addition of extraneous water, consisting in adding to the fruits a substantial quantity of dextrose, in subjecting the mixed fruits and dextrose to a freezing temperature to freeze the mixture and in maintaining the same after it is frozen at substantially a zero temperature until ready for use to preserve the fruits and to maintain their original color without changing their other physical characteristics.

JOHN G. MAGAW.
A. SHERMAN MAGAW.